United States Patent [19]

Parulski et al.

[11] Patent Number: 5,414,811
[45] Date of Patent: May 9, 1995

[54] METHOD AND APPARATUS FOR CONTROLLING RAPID DISPLAY OF MULTIPLE IMAGES FROM A DIGITAL IMAGE DATABASE

[75] Inventors: Kenneth A. Parulski; David L. Funston, both of Rochester, N.Y.

[73] Assignee: Eastman Kodak Company, Rochester, N.Y.

[21] Appl. No.: 202,853

[22] Filed: Feb. 25, 1994

Related U.S. Application Data

[63] Continuation of Ser. No. 796,207, Nov. 22, 1991, abandoned.

[51] Int. Cl.[6] .............................................. G06F 15/00
[52] U.S. Cl. ................................... 395/162; 395/164; 395/137; 382/296
[58] Field of Search ...................... 395/162, 164–166, 395/600, 157, 137, 133; 360/27, 35.1, 133; 396/29; 382/45–47; 358/448, 450, 453, 302; 345/10, 27, 55, 112, 119, 127, 120, 126, 185, 201

[56] References Cited

U.S. PATENT DOCUMENTS

| 4,554,638 | 11/1985 | Iida .................................. 395/137 |
| 4,675,755 | 6/1987 | Baumeister et al. ............... 360/35.1 |
| 4,947,344 | 8/1990 | Hayashi et al. .................... 395/137 |
| 4,985,848 | 1/1991 | Pfeiffer et al. ..................... 395/164 |
| 4,991,004 | 2/1991 | Hayashi et al. .................... 358/450 |
| 5,021,989 | 6/1991 | Fujisawa et al. ................... 364/900 |
| 5,191,440 | 3/1993 | Levine ................................ 358/450 |
| 5,218,455 | 6/1993 | Kristy ................................. 358/403 |

FOREIGN PATENT DOCUMENTS

| 0400503 | 5/1990 | European Pat. Off. ... G06F 15/403 |
| 3714172 | 11/1987 | Germany ..................... G06F 15/40 |
| WO87/00329 | 1/1987 | WIPO .......................... G09G 1/00 |
| WO90/04302 | 4/1990 | WIPO .......................... H04N 1/387 |

OTHER PUBLICATIONS

IBM Technical Disclosure Bulletin vol. 27 No. 1B Jun. 1984, "Realtime Rotation and Mirror Transformation of Square Images" by Konnerth et al.
"PACS: ein Zukunftsthema wird Gegenwart" by C. F. C. Greinacher at al., Electro Medica (Siemens) vol. 53, No. 3, 1985, pp. 96–103.

*Primary Examiner*—Mark R. Powell
*Assistant Examiner*—Kee M. Tung
*Attorney, Agent, or Firm*—David M. Woods

[57] ABSTRACT

A digital image processing system for displaying digitized images on a screen of a display unit includes a data base such as a compact disc on which the digitized images are stored, a plurality of image memories for holding the digitized images for display, and a display unit having a screen including a two-dimensional array of pixels. The screen is divided into sections by designating subsets of the screen pixels by row and column, and the images stored in the image memories are allocated to the sections of the screen by mapping image data pixels to the screen pixels. Under user control, different images may be displayed on different sections of the screen. The number of images, and the specific images from the data base, are user selectable and independently manipulable. To reduce a latency time for displaying images responsive to user commands, the images may be arranged in a sequence. Responsive to a user command to load a first image into an image memory and display it, one or more other images adjacent to the first image in the sequence are read from the data base and held in other image memories, otherwise unused. Thus, if a subsequent user command directs the system to display one of the adjacent images, the latency time for reading that image from the data base and holding it in another image memory is reduced.

20 Claims, 5 Drawing Sheets

METHOD AND APPARATUS FOR CONTROLLING RAPID DISPLAY OF MULTIPLE IMAGES FROM A DIGITAL IMAGE DATABASE

This is a Continuation of application Ser. No. 07/796,207, filed Nov. 22, 1991, now abandoned.

FIELD OF THE INVENTION

The present invention generally relates, to systems for storing and reproducing digitized sound and images, and, in particular, to a system for displaying digitized images responsive to user commands with minimum time delay and for displaying multiple images simultaneously.

BACKGROUND OF THE INVENTION

Copending application Ser. No. 582,305, filed Sep. 14, 1990, entitled "Multiresolution Digital Imagery Photofinishing System", by S. Kristy, assigned to the assignee of the present application and the disclosure of which is herein incorporated, describes a digital image processing system wherein photographic still images, such as those captured by way of a 35 mm camera, are digitized and recorded on an optical compact disc (CD), for subsequent playback on a CD player. Image data files are created by scanning the images on a roll of developed photographic film to produce digitized pixel data for the images, and storing the pixel data as image data files. A relatively permanent digital storage medium, such as an optical disc readable by a laser pickup, is then produced. A user having such a disc loads the disc into a disc player coupled to a display unit such as a video monitor or television. Then, by entering suitable commands into the disc player or a separate control unit, such as an IR remote (hand-held) device, the user displays selected images on the display unit.

A low cost, reduced complexity frame store/data retrieval architecture, incorporated into a CD player and which provides for rapid call-up of images stored as digitized image data and display of the images on a consumer television color monitor, is described in a copending U.S. patent application Ser. No. 583,265, filed Sep. 14, 1990, entitled "Mechanism for Controlling Presentation of Displayed Image", by K. Parulski et al, assigned to the assignee of the present application, and the disclosure of which being herein incorporated.

As described in the above-referenced applications, each captured image is digitized by the scanner and stored 'as is', regardless of its orientation on the film. Annexed to each image file is a header file which contains orientation, aspect ratio and other minilab operator-generated information that is readable by the data retrieval microcontroller of a CD player, to control the coupling of the image data to a reproduction device (e.g. TV display). Images are displayed by providing image data residing in an image memory to an output of the apparatus at which a display device is to be coupled. The apparatus maps image data pixels to pixels of a display screen of the display device for correct orientation and aspect ratio.

Now, although the above-referenced photo compact disc schemes provide a number of photographic image processing and playback capabilities not heretofore available, it would be desirable to provide additional convenience and flexibility to the user. First, there is inevitably a certain latency time between the time the user enters a command by way of an I/O device (e.g. keyboard, IR remote control unit) to view a selected image, and the time that image actually appears on the display screen. This latency time is largely due to the time required for locating the image data file on disc, reading the image data from the disc, and then loading the read-out image data into the image memory or frame store in the CD player. Typically, this latency time is about 1 to 4 seconds, long enough to be noticeable and inconvenient to the user. It would be desirable to reduce this latency time to a time short enough not to be noticeable to the user.

Secondly, some user applications of image display systems involve displaying multiple images, for instance for side-by-side comparison. Medical imaging applications and slide presentations are two applications in which display of two or more images in a side-by-side format is useful. Also, consumers may want to compare images side-by-side, for instance to select a preferred one of several portrait photos of the same person. In addition, the user may wish to browse through a library of images stored on the CD and select plural images for display.

One possible mechanism for displaying multiple images involves redundant playback and display. Unfortunately, the constant complexity of such a scheme would be prohibitive for a consumer or for other users who have budgetary or equipment space limitations. A user of a system which does not support multiple images has to switch back and forth between the images to be displayed and compared, and must repeatedly enter a display command for the images to be played back. The fact that such playback/display commands must be repeatedly entered and that the images are not simultaneously on display are inconvenient to the user. Accordingly, it would be desirable to save the user the inconvenience of entering repeated commands by allowing for simultaneous display of multiple images.

SUMMARY OF THE INVENTION

In order to provide the enhancements discussed above, and to provide additional convenience and flexibility to the user, the present invention provides a multiple memory frame store for storing respective ones of a plurality of images to be displayed on a display device. The invention additionally includes a programming capability for dividing the screen of the display device into two or more display regions or sections, allocating the screen sections to respective ones of the image memories of the frame store, displaying the images stored in the memories on the respective screen sections, and independently controlling the display of each image, all under user control responsive to user commands. The invention also includes a programming capability for arranging the images stored on the disc in a predetermined sequence, reading image data for a first image, storing the image data in a first image memory, and displaying the first image responsive to a user command, and for reading image data for a second image next to the first image in a sequence of images and storing the second image data in a second image memory responsive to the same user command. Thus, if the user subsequently enters a command for displaying the second image, the second image is accessed from the second image memory, whereby the latency time normally required for reading the image data for the second image from the disc is avoided.

Images to be displayed are preferably stored in a high resolution digital image data base such as an optically encoded digital compact disc. The disc includes a plurality of image data files containing image data corresponding with a plurality of images. The images may be originally captured on an image medium such as photographic film. A digitizing scanner scans the images on the film to produce digitized image data. A photofinisher controls the operation of a photofinishing workstation to write respective image data files onto a photo compact disc, each image data file corresponding to each of the images on the film. The photo compact disc is preferably programmed at the time the film is developed, i.e., a customer delivers the exposed film to a photo lab having equipment for developing the film, scanning the developed film images, and storing the digitized images on the disc. Afterward, the customer pays for and picks up the developed film and the programmed disc. The customer then inserts the disc into his own compact disc player, the player being coupled to a television or other image display device, and views the images by entering commands into a control panel of the player or through a remote control device.

The improved playback apparatus in accordance with the invention includes a multifile frame store comprised of a plurality of image memories, each image memory including a random access memory (RAM) of sufficient size to hold pixel data for all pixels of an image. The memory is addressed to access image data in a manner consistent with the arrangement of the pixels in the image or in the screen of the display unit. Preferably, the image data in a memory is addressed in terms of rows and columns of the pixel matrix. A given pixel is uniquely addressed in terms of a given row value and a given column value. Data for a respective pixel is either a grey code value, or, for a color image, a digital value of some number of bits per color for each of a plurality of primary colors. The total capacity of each memory is thus determined by the number of rows and columns, and the number of bits of the encoded digital value for each pixel.

An image is displayed by mapping pixels of the image data in an image memory, by row and column, to pixels of the display device. For correct orientation, rows of image data pixels are mapped to rows or columns of the display screen pixels in accordance with orientation information programmed onto the disc. Similarly, for a correct aspect ratio, rows or columns of image data pixels may be decimated, and neutral border pixels generated, as necessary to make the image fit onto the screen, in accordance with aspect ratio information also programmed onto the disc.

Multiple images are read from the disc and loaded into various ones of the plurality of image memories. This may be effected both automatically and in response to a user command. In accordance with a first aspect of the invention, the image data files are arranged in a specified sequence, preferably corresponding to the sequence through which images on the film were scanned to produce the image data files. When a user inputs a command for displaying a selected one of the images, the image data for the next image in the sequence is also read from the disc and loaded into another image memory. If the user subsequently commands that this next image be displayed, the image data is already stored in the frame store. As a result, instead of a 1 to 4 second latency time before the next image is displayed, the latency time is reduced to about 1/30 second. Of course, if some other image, out of sequence, is to be displayed, the image data must be read from the disc requiring the 1 to 4 second display latency time. However, given that in many instances the images are viewed in sequence, the multiple memory frame store allows the taking of an "educated guess" as to the next image that will be viewed so as to reduce the average latency time.

In accordance with a second aspect of the invention, image data from multiple images on the disc are loaded into different ones of the plurality of image memories and displayed simultaneously. This is accomplished by dividing up the pixel array of the display screen into adjacent regions or sections, and mapping different images in different image memories to respectively different areas of the display screen. Preferably, the display screen is treated as having n rows and m columns of pixels. In order to display two images, the screen is divided into two sections comprised of a first section containing columns 1 through m/2, and a second section containing columns m/2+1 through m. Similarly, the screen is divided into quadrants in order to display four images by similarly dividing the columns, and further by dividing the rows into 1 through n/2 and n/2+1 through n.

When a display screen is divided into two or more sections in this manner, the image data for each image which to be displayed is mapped by row and column to its section. Since fewer total rows and columns will be available for each image, a greater degree of decimation will be required than for a single image displayed on the entire screen. However, each image is controllable independently of the others. On the other hand, the system allows for selecting a plurality of the sections, so that a given command for manipulating the image will apply equally to two or more of the selected images. This feature is useful if several images are to be manipulated in the same way, for instance if corresponding sections of different images are to be magnified or zoomed, e.g. for closer comparison.

The display screen may be divided into any suitable number of sections for displaying different images. It is anticipated that dividing the display matrix into two equal halves by column and into four equal quadrants by row and column, is useful for many applications. Two images may be compared, side-by-side, by dividing the screen in half by column, providing a relatively fine detail and resolution for each of the two images. Displaying four images may be useful, for instance, in medical applications. As an example, two X-ray images may be displayed in their entirety in the upper left and right quadrants of the screen, while corresponding sections of these two images may be magnified or otherwise manipulated in the lower left and right quadrants of the screen.

The latency time for accessing, reading, and displaying an image on all or part of a screen may be reduced, in some cases. Image data files may be written into a data base, such as a compact disc, in a predetermined sequence, by writing the files into a sequence of contiguous addresses of the disc or by writing the files and a utility table including file IDs appearing in the utility file in a sequence corresponding with the file sequence. In addition, a utility table including file IDs in a modified file sequence may be stored in an EEPROM memory in the disc player, as described in co-pending patent application Ser. No. 582,72, filed Sep. 14, 1990, entitled "Auxiliary Removable Memory for Storing Image Parameter Data," by K. A. Parulski et al, assigned to the assignee of the present application and the disclosure of which is herein incorporated. In response to a user command, a file to be displayed is read out and loaded into a first image memory for display. The next image file is read out in sequence and loaded into a second image memory, with the image data maintained in a stand-by mode until the next user command is entered. If the next command is to display that image, the data stored in the second image memory is displayed. If a command to display some other image is entered, then the data is discarded or, if there are enough otherwise unused image memories available, it is maintained in memory in the event yet another user command calls for displaying that image.

The display screen is divided into a user-selectable number of sections by dividing the rows and columns of pixels in the screen. The images to be displayed concurrently are allocated to respective ones of the sections. The rows and columns of pixels of image data in the image memories are mapped to the rows and columns of display screen pixels in the screen sections corresponding to the images. To provide proper orientation of the image, rows of pixels of image data may be mapped to columns of screen pixels. The rows and columns of image data are decimated as necessary to fit into the screen sections. Borders are generated as necessary to accommodate various image aspect ratios. The displayed images may be independently manipulated, such as by zooming, panning, etc., independently in response to user commands. However, different ones of the images may be selected to respond to a single command for image manipulation under user control.

DETAILED DESCRIPTION OF THE PREFERRED EMBODIMENTS

Figure 1:
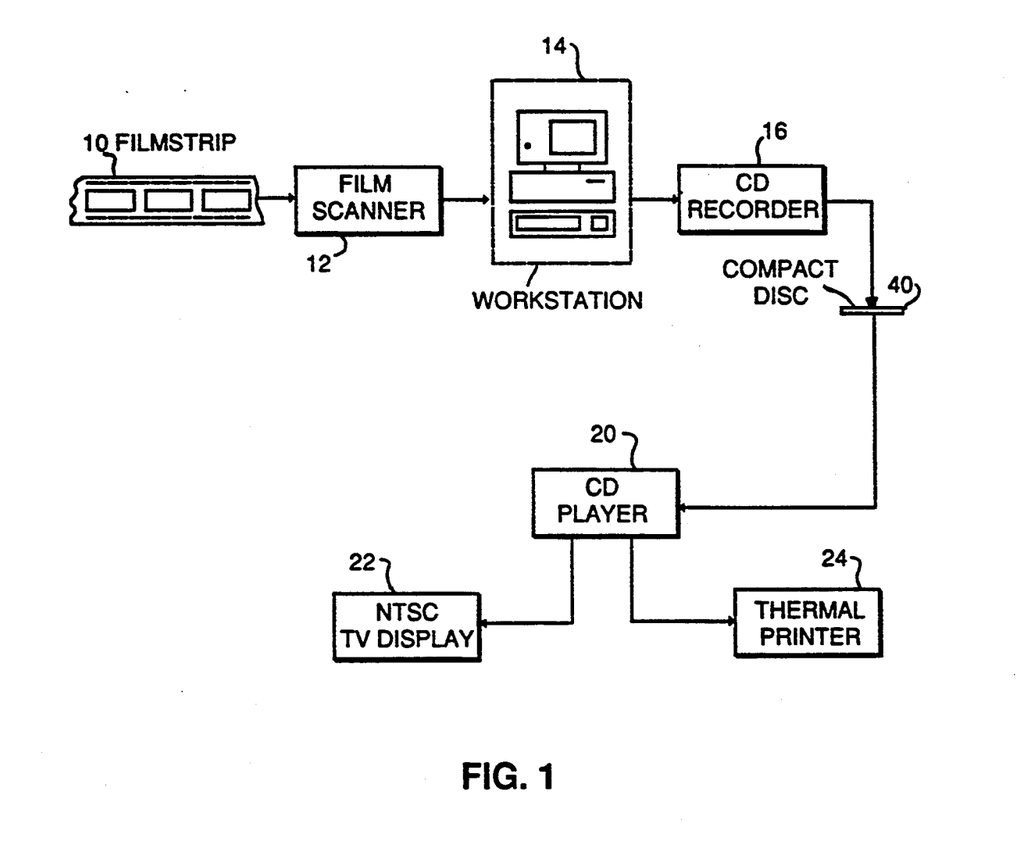
FIG. 1 is a simplified block diagram showing a compact disc data base storage medium, along with a system for generating image data files from images and storing the image data files on the disc, and a system for reading the image data files and displaying the images.

FIG. 1 diagrammatically illustrates a photographic color film processing system, such as a photofinishing minilab, for producing a compact disc encoded with image files containing digitized image data. The disc constitutes a data base which is inserted into a compact disc player having the multiple memory storage and access capability in accordance with the invention. It should be observed, however, that the color film processing system of FIG. 1 and described here is merely an example of one type of system with which the invention may be used and is not to be considered limitative of the invention.

In accordance with the digital image processing system of FIG. 1, photographic images, such as a set of twenty-four or thirty-six 36 mm×24 mm image frames of a 35 mm film strip 10, are scanned by a high resolution opto-electronic film scanner 12, such as a commercially available Eikonix Model 1435 scanner. High resolution scanner 12 outputs digitally encoded data (e.g. a 3072×2048 pixel matrix) representative of the internal electronic scanning of a high resolution image sensing array onto which a respective photographic image frame of film strip 10 is projected. This digitally encoded data (digitized image) is coupled in the form of an imaging pixel array-representative bit map to an attendant image processing workstation 14, which contains a frame store and image processing application software through which the digitized image is processed (e.g. enlarged, cropped, subjected to a scene balance correction, etc.) to achieve a desired image appearance. Once an image file has been prepared, it is stored on a transportable data base storage medium, such as a write-once optical compact disc 40, using compact disc recorder 16. The disc 40 may then be inserted into a compact disc player 20 and, via the operation of selector switches of a cabinet-resident control panel or an (IR) remote control unit 200 shown in FIG. 4, a selected image file is accessed for display on a display device shown as a television set 22. The CD player may also be coupled to a high resolution thermal printer 24 for obtaining a hard copy of a selected image.

In accordance with the image processing system described in the above-referenced Kristy application, each digitized high resolution image is stored as a respective "image pack" data file containing a low (or base) resolution image bit map file, and a plurality of higher resolution residual image files associated with respectively increasing degrees of image resolution. By iteratively combining the higher resolution residual image file data with the low resolution image bit map file data, successively increased resolution images may be recovered from the base resolution image.

As an example, spatial data values representative of a high resolution (3072×2048) image scan of a 36 mm-by-24 mm image frame of a 35 mm film strip 10 are stored as a respective image data file including a base resolution image bit map file containing data values associated with a spatial image array of 512 rows and 768 columns of pixels and an associated set of residual image files to be stored on the disc. Within the workstation itself, the base resolution image may be further sub-sampled to derive an even lower resolution sub-array of image values (e.g. on the order of 128×192 pixels) for display on a segment of the system operator's workstation for the purpose of identifying image orientation and specifying aspect ratio.

Preferably, as described in the above-referenced Parulski et al application, a header file is associated with each digitized image for the purpose of specifying how the image was captured on film and has been correspondingly digitized and stored on disc. The information in the header file is used by the playback device to insure that the image will have an upright orientation and the correct aspect ratio for the reproduction device. In addition, a master header file is recorded which includes a unique ID number for each disc recorded by CD recorder 16 in FIG. 1, in order to uniquely identify each disc.

When a film strip is originally scanned in the photo-processing minilab, each picture is digitized as though it were horizontally oriented, irrespective of its actual orientation on the film. The digitized image is stored in the workstation's frame store, as is, and a lower resolution version of the digitized image is displayed on the display monitor of workstation 14, so that the image may be viewed by the operator. As each image is digitized and stored on the disc, the photofinishing minilab operator, using a workstation input device, enters a set of 'presentation' control codes that are incorporated within the header file associated with a respective image file to indicate how the image has been stored, so that, when subsequently accessed by a reproduction device, the image will be played back in an upright orientation at the correct aspect ratio.

Figure 2:
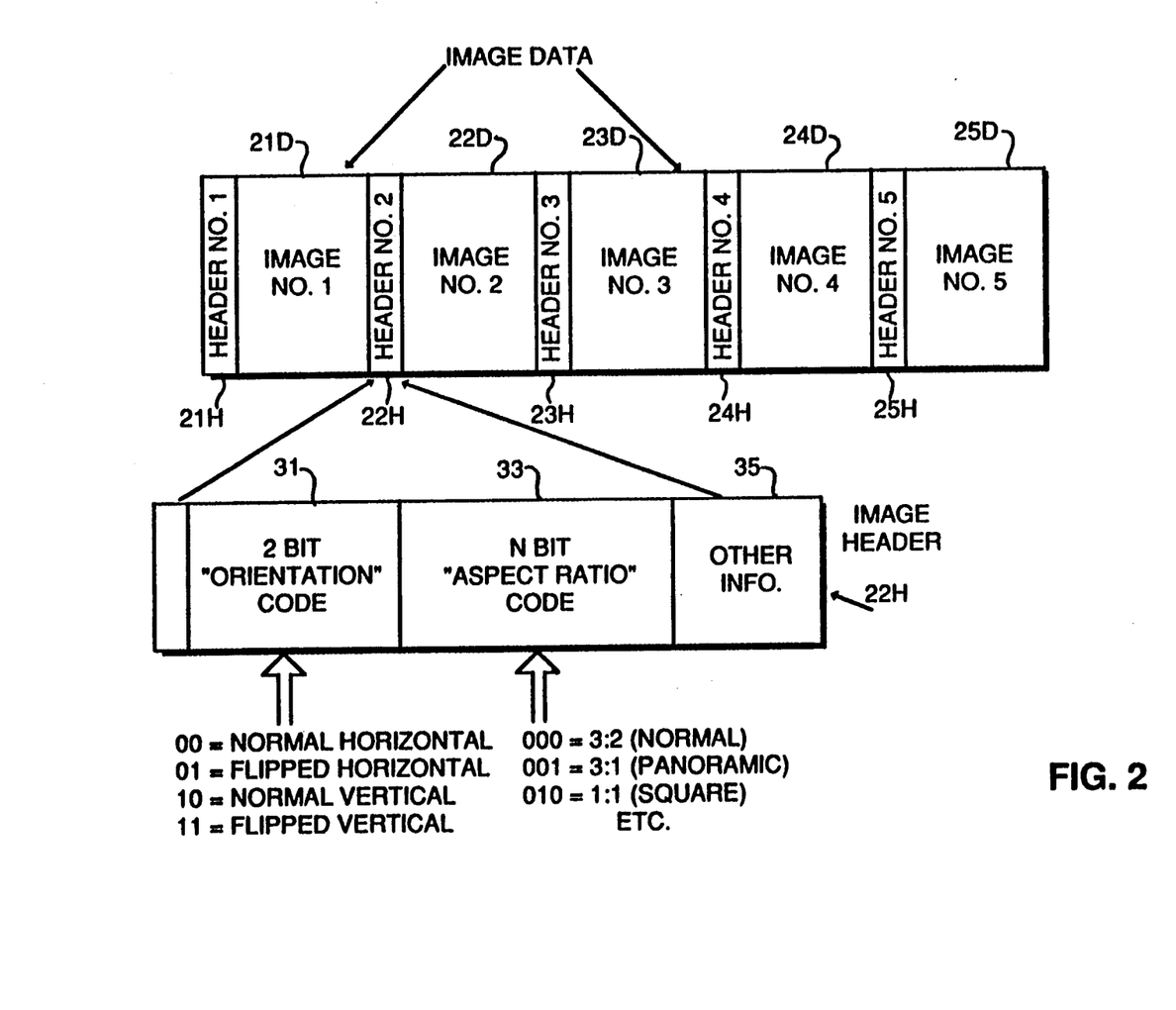
FIG. 2 is a partial memory map of the data base of FIG. 1, showing an image data file format including image data and a header.

Referring now to FIG. 2, there is shown an example of the data file arrangement of the data base produced as described above. A memory map of the data base contains a series of image data files. Each image data file includes a header followed by a block of image data. For instance, a first image data file includes a header 21H and image data 21D, a second image data file adjacent to the first image data file includes a header 22H and image data 22D, etc. A preferred format for the headers is shown as a magnification of the header 22H.

The header includes several fields, each field containing a designated piece of information. A first field 31 includes an orientation code. In a two-dimensional image, essentially rectangular in shape, any of the four sides could be the bottom. When the film image on the film strip 10 is scanned by the scanner 12, the scan proceeds sequentially through the images on the film strip, without regard to the orientation of the images. However, when recording digital images on the disc, the workstation operator enters a command representative of the orientation of the image, which is stored in an orientation field 31.

A second field 33 contains an aspect ratio code. The aspect ratio, or ratio of the height to width of the image, is used to determine what image data decimation or border generation is necessary to make the image fit onto the screen, or what the portion of the screen is allocated for display of the image. Again, an aspect ratio code is entered by the workstation operator at the time the disc is recorded.

Figure 3:
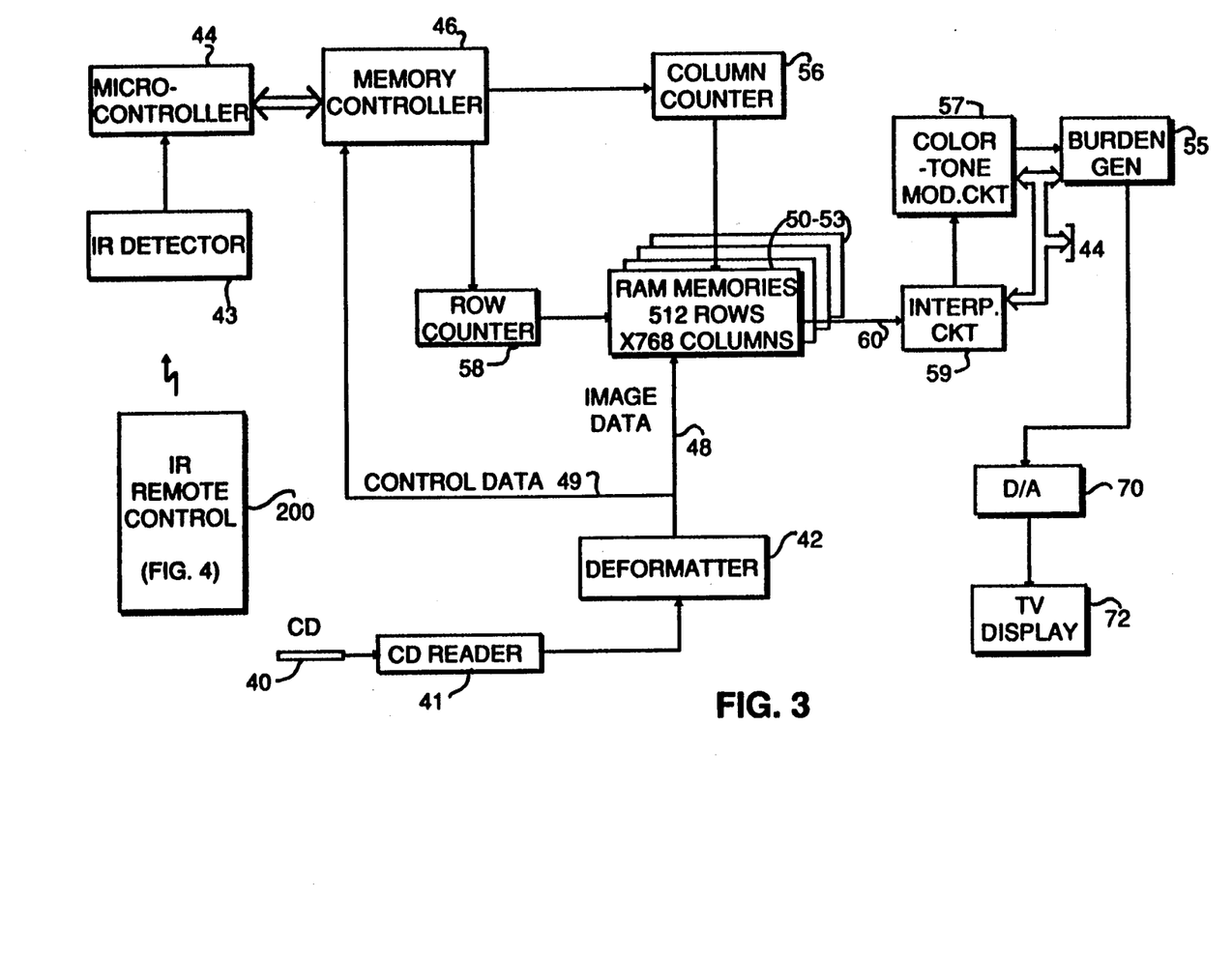
FIG. 3 is a detailed block diagram of the system for reading and displaying an image stored on disc by the system of FIG. 1.

FIG. 3 is a more detailed block diagram of the signal processing architecture of the image retrieval mechanism shown in FIG. 1, which allows multiple images to be combined for viewing on a single video display. As in the above-referenced Parulski et al application, the playback device itself is preferably a commercially available compact optical disc player, which accesses digital image files that have been stored on disc and supplies video signals to a user's color television monitor. The contents of the digital image data file read from an optical compact disc 40 by a reader 41, such as a laser pickup, are coupled to a deformatter 42, wherein the file is deformatted into a digitized image and its associated header field, under the control of a resident microcontroller 44. Four image memories, or frame stores, 50 through 53 are shown in the illustrated embodiment of the invention, although a different number of image memories are also usable in accordance with the invention. A respective image is stored in one of the four frame stores 50–53, while the contents of its header field are coupled to a memory access control circuit 55. Memory access control circuit 55 includes a memory controller 46, a column counter 56, and a row counter 58, and controls the transfer of the image data from the disc into one of the frame stores 50–53 and the read-out of the contents of a frame store to associated circuitry including interpolation circuit 59, color and tone modification circuit 57, border generator 55 and a digital-to-analog (D/A) converter 70 for driving a color television display 72.

Depending upon the aspect ration code 33 in FIG. 2, the memory access control circuitry adjusts the aspect ratio and size of the image eventually supplied by the frame store to the television display. Details of the memory access control architecture are presented in the previously referenced Parulski et al application Ser. No. 583,265.

Figure 4:
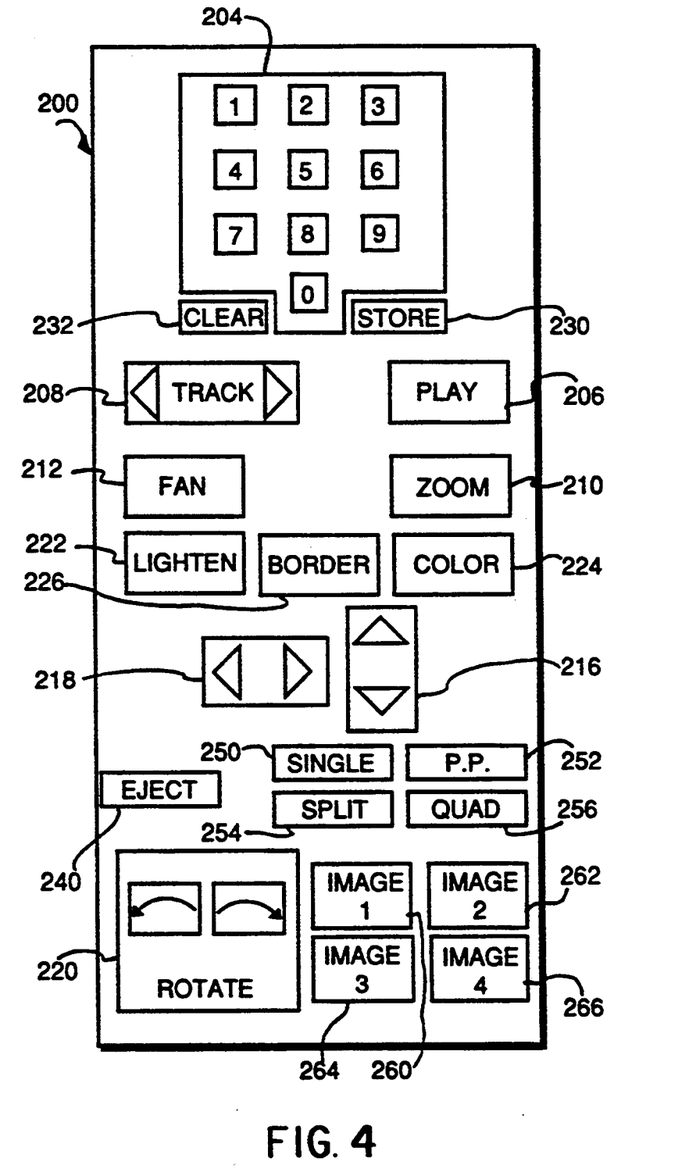
FIG. 4 is a front view of a user command input apparatus for use with the system for reading of FIG. 3.

Turning now to FIG. 4, the command key layout of a user-operated I/O command unit 200 is shown in the form of a hand-held remote control unit which produces an infrared (IR) beam for communicating user commands to the system. To receive the IR commands from the remote control unit 200, the player (FIG. 3) includes an IR detector 43. Remote control unit 200 is used for entering user commands for selecting images to be displayed, and determining how many images are to be displayed simultaneously. Preferably, unit 200 is of conventional construction and preferably comprises a commercially available infrared remote control transmitter Model No. SAA 3007 manufactured by N. A. Philips Corporation that has a large command programming capacity (e.g. the Model SAA 3007 can accommodate 1280 commands). The key layout may be tailored as desired and in the embodiment shown in FIG. 4 includes function keys for multiple memory access in accordance with the invention. The remote control unit microcontroller reads these additional function keys in the same manner as other function keys.

In order to facilitate an understanding of the multiple image control feature of the present invention, the following discussion will explain both the operation and the data structure used to assemble respective images and associated parameter fields that are defined in the course of customizing one or a plurality of images.

When an optical compact disc onto which digitized image files have been recorded is inserted into the playback device 20 in FIG. 1, the presentation of images on the NTSC display 22 is controlled by the user via the IR remote control unit 200, the function key layout of which is shown in greater detail in FIG. 4. Individual images are viewed by entering the image number using numerical digit buttons 204 and then pressing a play button 206, or by pressing either a track forward or a track backwards arrow, shown together as 208, to move on to the next or back to the previous image of the sequence of images on the disc 40. The image sequence is preferably a numerical order, such as the order in which the images appeared on the film 10. Therefore, after photofinishing, the numerical sequence on the film and the disc match. The image sequence may alternately be provided from a list of image numbers programmed by the user employing the remote control unit of shown in FIG. 4 and stored in an electrically erasable memory contained within the player or located in a removable unit, as described for example in the above-referenced '727 Parulski et al patent application.

In accordance with the invention, an initial command for viewing a user selected image causes the image data file for that image to be read from the disc 40, and the image data to be loaded into one of the image memories 50–53. Also responsive to that command, one or more other image data files for images sequentially adjacent to the user selected image are read, and the image data are loaded into one or more other image memories. Accordingly, a subsequent command to display the next or previous image causes the system to display the image already loaded into the other image memory. Latency time is reduced, because the image data is not being read from the disc. In response to the command for the next or previous image, another image prior or subsequent to the image being displayed is read from the disc and loaded into another image memory, where it is ready to be displayed if another command is entered.

While there is no way to perfectly predict which image the user will want to display next, in many cases the user scans through the images in sequence, forward or backward. The arrangement discussed here provides an "educated guess" which in many cases accommodates the user's commands while reducing the latency time. The system thus has a better "feel" to the user.

As the image data is read from the disc 40, the presentation control data described in the Parulski et al application is used to control the memory access control circuit 46, so that the correctly oriented image is read from framestores 50 through 53. Specifically, image data pixels are mapped to display screen pixels, by row and column numbers. The image is rotated zero degrees by mapping rows of data pixels to rows of screen pixels and columns of data pixels to columns of screen pixels. The image is rotated 90 degrees by mapping rows of data pixels to columns of screen pixels and columns of data pixels to rows of screen pixels in reverse order. The image is inverted or rotated 180 degrees by mapping rows of data pixels to rows of screen pixels in reverse order, and columns of data pixels to columns of screen pixels in reverse order. The image is rotated 270 degrees by mapping rows of data pixels to columns of screen pixels in reverse order, and columns of data pixels to rows of screen pixels in correct order. The images are displayed in accordance with the orientation information in the presentation control file. However, should the orientation code in the presentation control data be in error, due for example to an operator erroneously programming the presentation control data for the particular image in the course of recording the image onto the disc via CD recorder 16 (FIG. 1), then the user re-orients the image via rotate buttons 220.

The rows and columns of data pixels are decimated as necessary to map the image to the rows and columns of the display screen. The image is cropped by selecting upper and lower intermediate pixel data row and column numbers to define a subset of the image data, and mapping to the screen only those data pixels which fall between the selected intermediate row and column numbers.

The user may also zoom in or out to display only a portion of the image in enlarged form by pressing the zoom button 210 followed by either the up/down arrow keys 216, which instruct the memory control circuit 46 to read out the proper portion of the image stored in the appropriate frame store memory (50–53) which is processed by interpolation circuit 59, to provide the pixels of the enlarged image. To zoom the image for greater magnification, the subset is gradually reduced in size by increasing and decreasing the upper and lower intermediate row and column numbers, respectively, incrementally over a period of time during which the user operates the control. To zoom for lesser magnification, the upper and lower row and column numbers are decreased and increased, to increase the size of the subset.

The user may also pan through an image in a manner similar to zooming. Panning is either vertical or horizontal. Upper and lower intermediate rows and columns are defined. For horizontal panning, the intermediate row numbers remain constant, and the intermediate column numbers both increase, for left-to-right panning, or decrease, for right-to-left panning, incrementally over the time period in which the user operates the control. In vertical panning, the column numbers remain constant, and the row numbers increase or decrease incrementally.

Further, the user may alter the appearance of any displayed image by pressing the 'lighten' button 222 followed by either the up/down arrow key 216, which cause the supply of control codes for increasing or decreasing the contrast of the image, respectively, or the left/right arrow key 218, which increase or decrease the brightness of the image, respectively, by properly operating a color and tone modification circuit 57 to alter the brightness, or contrast of the digitized image as desired. This is done by performing a suitable mathematical transformation on the image data values from the appropriate image memory (50–53), such as increasing all values to increase brightness, increasing or decreasing values for certain colors to change color balance, etc. These transformations are facilitated through the use of digital lookup tables.

The user may also alter the color of the displayed image. For this purpose, the user depresses a color button 224, followed by either the up/down arrow key 216, which cause the generation of control codes to increase or decrease the color saturation of the image, or the left/right arrow key 218, which alter the color balance of the image, by instructing the color and tone modification circuit 57 to alter the color of the digitized image by means of a digital 3×3 color correction matrix circuit (not shown).

The user also creates a colored border in the image via a color border generator and text generator 55, by first pressing the border button 226 followed by the arrow keys 216 and 218 which allow the border to be properly positioned. The color of the border is changed by pressing the color button 224 and the border button 226 simultaneously, and then pressing the keys 216 to alter the color saturation, or the keys 218 to alter the color hue. A border may be used for filling a portion of the display screen if the preferred aspect ratio of a magnified and panned image differs from that of the display screen. If, for instance, the recomposed image has a preferred width-to-height ratio of 3:1 and the display has a 4:3 ratio, to fit the entire image onto the screen, the image is decimated such that the image width matches the screen width. The height of the image is then less than the screen height. The image pixels are mapped to a subset of the screen, leaving a blank portion of the screen above an upper intermediate row, or below a lower intermediate row. The border, comprising the portion of the screen above the upper intermediate row or below the lower intermediate row, is filled in with the border color.

In response to additional user commands, the invention divides the screen into two or more sections, in which different images are simultaneously displayed. Each image within each screen section is independently controllable as described above. In the illustrated system having four image memories 50–53, up to four images may be displayed. The number of images displayed on TV display 72 is controlled by control keys labelled "single" 250, "picture in picture" (P-P) 252, "split" 254 and "QUAD" 256. The display of each individual image is controlled by control keys 260, 262, 264 and 266 in FIG. 4, labelled IMAGE 1 through IMAGE 4. In operation, the user depresses one of the four control keys 250, 252, 254, 256 and then depressed the IMAGE 1 key 260 and selects an image as described above. Depending upon which of the control keys 250, 252, 254 and 256 have been pressed, the user may next depress the IMAGE 2 key 262, of the IMAGE 2 key, IMAGE 3 key 264, and IMAGE 4 key 266 to select the desired images.

In alternative embodiments of the invention, there could be a larger number of image memories may be employed, where having separately numbered keys would be impracticable. In such embodiments, the control device (FIG. 4) has a multiple image key. The user depresses this key, keys in an image number in the numerical keypad, and then proceeds as described above.

Turning now to FIGS. 5 through 8, there are shown four examples of a display screen for the display of multiple images in accordance with the invention. For the purpose of discussion, the display unit is a two-dimensional array of pixels arranged as 512 rows×768 columns. The upper left corner is row 1 and column 1. The upper right corner is row 1 and column 768. The lower left corner is row 512 and column 1. The lower right corner is row 512 and column 768.

Figure 5:
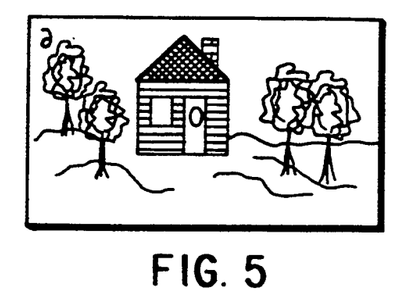
FIGS. 5 through 8 are examples of display unit screens showing various images which are provided in accordance with the invention.

In FIG. 5, a single image takes up all 512 rows and all 768 columns. The display mode is used when the "single" key 250 is depressed. Rows and columns of image data pixels in a first image memory are mapped to the pixels of the display. If the image data includes more than 512 rows or more than 768 columns, then rows or columns of image data are decimated in a suitable ratio to the total number of rows or columns such that 512 rows and 768 columns remained.

Figure 6:
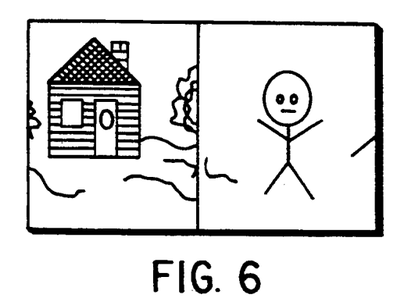

In FIG. 6, the user has depressed "split" key 254, which splits the screen into two halves. This is accomplished by establishing a first screen section including columns 1 through 384, and a second section including columns 385 through 768. The image shown in FIG. 5 is shown, in part, in the first screen section of FIG. 6. Of course, the number of columns in the first screen section is less than that of the full screen, so the first image does not fit exactly as in FIG. 5. The image is cropped to fit. Specifically, columns 1 through 192 and 577 through 768 are truncated, leaving columns 193 through 576, the middle portion of the image. The second section of the screen displays a second image.

The system also provides other ways of fitting an image into a screen section. For instance, if only the columns of the image are decimated, for instance by 50%, then the image of FIG. 5 would appear to have been distorted (squashed) to fit into the first screen section, which is half as wide. Alternatively, if both rows and columns of the image of FIG. 5 are decimated by 50%, then the image is reduced in size, but is not distorted. Upper and lower borders are visible in the first screen section, above and below the reduced size image. As described above, these border regions are colored in, under user control.

Figure 7:
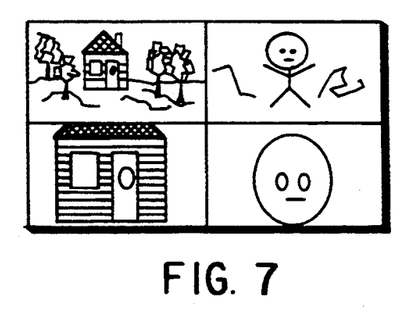

Turning now to FIG. 7, the user has depressed "QUAD" key 256, which divides the screen into four quadrants. The screen is divided by column, into columns 1 through 384, and columns 385 through 768, as before. In addition, the screen was divided by row into rows 1 through 256, and rows 257 through 512. Each quadrant has the same relative dimensions as the full screen, so the image of FIG. 5 fits in its entirety, except for row and column decimation to reduce size, into the upper left quadrant. The upper right quadrant contains a second image, which also fits the relative dimensions of the quadrant. The image in the right half of FIG. 6 is a middle section of the image of the upper right quadrant of FIG. 7. The image was originally the same size as that of FIG. 5. It was cropped, as the first image was, to fit into the right half of FIG. 6, and then row and column decimated to fit into the upper right quadrant of FIG. 7. The lower left and right quadrants of the screen each show magnified subsets of the images on the upper left and right quadrants, respectively. In accordance with the invention, each image on each screen section may be manipulated independently by user command, or a plurality of the sections are selected such that a single user command manipulates each of the selected sections the same way. In the illustrated example, central portions of each of the upper images are magnified in the respective lower images. This includes the lower part of the house on the left, and the head of the figure on the right. Magnification includes cropping of the portions of the image not of interest. Also, since a smaller part of the overall image is displayed, less decimation of rows or columns within the portion of interest results in greater detail and finer resolution of the portion of interest.

As discussed above, this feature of the invention may be used in medical applications. The upper quadrants may be used to display two X-ray films of a patient taken at different times, between which a tumor developed and grew. To monitor the growth of the tumor, the particular portion of each X-ray film showing the tumor, which would be in the same portion of each film, is magnified by a single user command directed to the lower left and right images. Thus, the two images of the tumor taken at two different times are easily compared, and the context of each image is seen by comparing upper and lower respective images.

Figure 8:
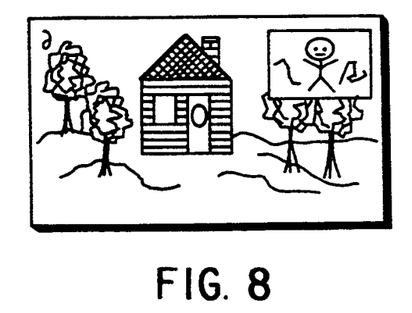

Turning now to FIG. 8, there is shown another example of how a display screen may be divided to display multiple images. Rather than dividing the screen equally, a small window is inserted near a corner of the display. This is accomplished by selecting a window based on row and column numbers. For instance, in the 512 row by 768 column display shown, the window comprises pixel rows 64 through 192 and pixel columns 512 through 704. The rectangular region defined thus is a window for a more highly decimated secondary image, while the remainder of the screen, including narrow strips above and to the right of the secondary window, are devoted to a primary image. The portion of the primary image data which would fit into the area of the window is simply discarded. The primary and secondary images may be manipulated independently of each other by changing the way in which the image data pixels are mapped to the relevant portions of the screen. This feature is useful, for instance, for finding a first image of interest (displayed as the primary image) and then examining the remaining images one by one (in the secondary window) to locate an image to be viewed concurrently with the primary image. Once the secondary image is located, the user enters commands to change from a primary/secondary display format, as in FIG. 8, to a side-by-side format, such as FIG. 6, and the two images are then compared easily.

The steps through which a user may independently display and adjust multiple images will now be described using the QUAD mode in FIG. 7. The user first depresses the QUAD control button 256, which divides the display screen into four quadrants as described above.

The user next depresses one of the image controls: IMAGE 1 260, IMAGE 2 262, IMAGE 3 264, or IMAGE 4 266. After IMAGE 1 260 is depressed, the user next selects the desired image to be displayed in the upper left display quadrant using controls 204 or 208, as described earlier. Once the desired image 1 is displayed, the user may alter the composition of image 1 using the PAN button 212, ZOOM button 210 or the ROTATE button 220 or may alter the tone or color of the image using the LIGHTEN button 222 or COLOR button 224. These control buttons instruct tone and color modification circuit 57 to alter the tone and color reproduction for only the upper left quadrant image.

The user proceeds to press the IMAGE 2 control 262 and selects the desired image for the upper right quadrant. The user may alter the composition, tone, or color of the upper right image using the controls described earlier. The user proceeds in a similar fashion by pressing the IMAGE 3 button followed by the appropriate controls to obtain the desired image in the lower left quadrant, and finally presses the IMAGE 4 button followed by the appropriate controls to obtain the desired image in the lower right quadrant.

The user may also press two or more of the IMAGE 1, 260, IMAGE 2 262, IMAGE 3 264 and IMAGE 4 266 controls in sequence. This applies the subsequent image composition and tone and color operations to the two or more images selected. In the example described earlier relative to FIG. 7, the displayed images of the house and person may be generated as follows.

The user first depresses the IMAGE 1 control 260 followed by the IMAGE 3 control 264, and then employs controls 204 or 208 to locate and display the house image in both the upper left and lower left quadrants. Next, the user depresses the IMAGE 2 control 262 followed by the IMAGE 4 control 266, and again employs controls 204 or 208 to locate and display the image of the person in both the upper right and lower right quadrants. Finally, the user depresses the IMAGE 3 control 264 followed by the IMAGE 4 control 266, and then uses the zoom control 210 and the pan control 212 to enlarge the same section of the two lower quadrant images by the same amount.

While I have shown and described an embodiment in accordance with the present invention, it is to be understood that the invention is not limited thereto, but is susceptible to numerous changes and modifications as known to a person skilled in the art. I therefore do not wish to be limited to the details shown and described herein, but rather intend to cover all such changes and modifications as are obvious to one of ordinary skill in the art.

What is claimed is:

1. A method, for use with a digital image processing system including a digital database having a plurality of images digitized as image data and stored in respective image data files therein, a plurality of image memories, and an output for coupling thereto an image display device having a screen for display of images, for controlling the display of the images, the method comprising the steps of:
    defining the screen to contain a plurality of sections;
    selecting a plurality of image data files;
    reading image data from the selected plurality of image data files and loading the image data into respective image memories;
    allocating at least two image memories containing image data to at least two sections of the screen, respectively;
    displaying the image data from the at least two image memories on the respective screen sections;
    selecting a plurality of the images displayed on the screen sections for manipulation; and
    manipulating each of the selected images responsive to a single user command so that each selected image is manipulated in the same way at the same time.

2. A method as recited in claim 1 wherein:
    the screen includes a two-dimensional array of screen pixels arranged in rows and columns; and
    the step of defining includes selecting a plurality of subsets of the screen pixels, by row and column.

3. A method as recited in claim 2 wherein the image data includes a plurality of image data pixels, each pixel datum having a row and a column associated therewith, and the step of displaying includes mapping the image data pixels to the screen pixels of the respective screen section, by row and column.

4. A method as recited in claim 3 wherein the step of manipulating the displayed images comprises changing the mapping of the image data pixels to the screen pixels of the respective screen sections.

5. A method as recited in claim 3 wherein the step of manipulating includes decimating the image data.

6. A method as recited in claim 3 wherein the step of manipulating includes cropping the image data.

7. A method as recited in claim 3 wherein the step of manipulating includes zooming the image.

8. A method as recited in claim 4 wherein the step of manipulating includes panning the image.

9. A method as recited in claim 3 wherein the step of mapping includes one of:
    mapping rows of image data to rows of screen pixels of the section and columns of image data to columns of screen pixels of the section, thereby orienting the image at a 0° angle to the screen;
    mapping rows of image data to columns of screen pixels of the section and columns of image data to rows of screen pixels of the section in reverse order, thereby orienting the image at a 90° angle to the screen;
    mapping rows of image data to rows of screen pixels of the section in reverse order and columns of image data to columns of screen pixels of the section in reverse order, thereby orienting the image at a 180° angle to the screen; and
    mapping rows of image data to columns of screen pixels of the section in reverse order and columns of image data to rows of screen pixels of the section, thereby orienting the image at a 270° angle to the screen.

10. An apparatus, useful with a system including a digital database that stores sequentially adjacent image data files containing digitized image data corresponding to input images, for controlling the manner in which the digitized image data is accessed from the image data files in the digital database and provided to an output of the apparatus for display on an image display device, said apparatus comprising:
    a plurality of image memories for storing digitized image data read from the database;
    user command means for registering user commands, including a particular read command to read and display a selected image data file from the database and a subsequent user command to read and to display a sequentially adjacent image data file; and control means responsive to the particular read command for reading the selected image data file and storing the corresponding image data in one of the image memories for subsequent display on the display device, wherein said control means is further responsive to said particular read command for reading one or more image data files sequentially adjacent to the selected image data file and storing the corresponding one or more sequentially adjacent digitized image data in one or more of the remaining image memories without displaying said sequentially adjacent data files until said subsequent user command is registered, whereby access time to display the sequentially adjacent image file pursuant to said subsequent user command is shortened because the sequentially adjacent image file has already been read from the database into one of said image memories.

11. An apparatus as recited in claim 10 wherein a plurality of sections are defined in the image display device and wherein said control means associates the image data in the image memories with respective ones of the sections.

12. An apparatus as recited in claim 11 wherein the image display device includes a television display having a two-dimensional array of pixels arranged in rows and columns; and wherein said control means defines sections of the image display device in terms of pixel rows and columns, and maps pixels of the image data in the respective memory devices to the respective sections of the array by row and column.

13. An apparatus as recited in claim 12 wherein the mapping performed by said control means includes decimating the image data.

14. An apparatus as recited in claim 12 wherein the mapping performed by said control means includes cropping the image data.

15. A method, for use with a digital image processing system including a digital database having a plurality of images digitized as image data and stored in respective image data files therein, said image data including a plurality of image data pixels, each image data pixel having a row and column associated therewith, a plurality of image memories, and an output for coupling thereto an image display device having a screen for display of images, such display including a two-dimensional array of screen pixels arranged in rows and columns, the method comprising the steps of:
defining the screen to contain a plurality of sections, each section including a plurality of subsets comprising rows and columns of screen pixels;
selecting a plurality of image data files;
reading image data from the selected plurality of image data files and loading the image data into respective image memories;
allocating at least two image memories containing image data to at least two sections of the screen, respectively;
displaying the image data from the at least two image memories on the respective screen sections by mapping the image data pixels onto the screen pixels of the respective screen section, by row an column;
selecting a plurality of the images displayed on the screen for manipulation; and
manipulating each of the selected images in response to a single user command so that all of the selected images are manipulated in the same way at the same time, said manipulating step comprising the step of zooming the image by defining, by minimum and maximum row and minimum and maximum column, a subset of the image data, redefining the subset by one of (a) increasing the minima and decreasing the maxima, and (b) decreasing the minima and increasing the maxima, incrementally over a period of time responsive to a user command, and displaying the subset, in accordance with the changing definition of the minima and maxima of the subset, concurrently with the time period over which the minima and maxima are redefined.

16. A method, for use with a digital image processing system including a digital database having a plurality of images digitized as image data and stored in respective image data files therein, said image data including a plurality of image data pixels, each image data pixel having a row and column associated therewith, a plurality of image memories, and an output for coupling thereto an image display device having a screen for display of images, such display including a two-dimensional array of screen pixels arranged in rows and columns, the method comprising the steps of:
defining the screen to contain a plurality of sections, each section including a plurality of subsets comprising rows and columns of screen pixels;
selecting a plurality of image data files;
reading image data from the selected plurality of image data files and loading the image data into respective image memories;
allocating at least two image memories containing image data to at least two sections of the screen, respectively;
displaying the image data from the at least two image memories on the respective screen sections by mapping the image data pixels onto the screen pixels of the respective screen section by row an column;
selecting a plurality of the images displayed on the screen for manipulation; and
manipulating each of the selected images in response to a single user command so that all of the selected images are manipulated in the same way at the same time, said manipulating step comprising the step of panning the image by defining, by minimum and maximum row and minimum and maximum column, a subset of the image data, redefining the subset by one of (a) increasing the row minimum and maximum, (b) decreasing the row minimum and maximum, (c) increasing the column minimum and maximum, and (d) decreasing the column minimum and maximum, incrementally over a period of time responsive to a user command, and displaying the subset, in accordance with the changing definition of the minima and maxima of the subset, concurrently with the time period over which the minima and maxima are redefined.

17. An apparatus, useful with a system including a digital database that stores sequentially adjacent image data files containing digitized image data corresponding to input images, for controlling the manner in which the digitized image data is accessed from the image data files in the digital database and provided to an output of the apparatus for display on an image display device, said apparatus comprising:

a plurality of image memories for storing digitized image data read from the database;

user command means for registering user commands, including a particular read command to read and display a selected image data file from the database and a subsequent user command to read and to display a sequentially adjacent image data file;

control means responsive to the particular read command for reading the selected image data file and storing the corresponding image data in one of the image memories for subsequent display on the display device, wherein said control means is further responsive to said particular read command for reading one or more image data files sequentially adjacent to the selected image data file and storing the corresponding one or more sequentially adjacent digitized image data in one or more of the remaining image memories, whereby access time to display the sequentially adjacent image file pursuant to said subsequent user command is shortened because the sequentially adjacent image file has already been read from the database into one of said image memories; and means for controllably generating border image signals representative of image characteristics of at least one border region to be combined with the image data, and for coupling the border image signals to the image display device so that the image reproduced thereby is bound by the at least one border region.

18. An apparatus, useful with a system including a digital database that stores sequentially adjacent image data files containing digitized image data corresponding to input images, for controlling the manner in which the digitized image data is accessed from the image data files in the digital database and provided to an output of the apparatus for display on an image display device, said apparatus comprising:

a plurality of image memories for storing digitized image data read from the database;

user command means for registering user commands, including a particular read command to read and display a selected image data file from the database and a subsequent user command to read and to display a sequentially adjacent image data file; and control means responsive to the particular read command for reading the selected image data file and storing the corresponding image data in one of the image memories for subsequent display on the display device, wherein said control means is further responsive to said particular read command for reading one or more image data files sequentially adjacent to the selected image data file and storing the corresponding one or more sequentially adjacent digitized image data in one or more of the remaining image memories, whereby access time to display the sequentially adjacent image file pursuant to said subsequent user command is shortened because the sequentially adjacent image file has already been read from the database into one of said image memories, and wherein said control means comprises means for controllably reading image data files from the database in a first selected order; and means for loading image data from the thus read image data files into respective ones of the plurality of image memories in a second selected order.

19. An apparatus as recited in claim 18 wherein said control means further includes:

means for arranging the image data files in the database into a predetermined sequence which defines the selected order in which the image data files are to be read.

20. A method for controlling the manner in which digitized image data is accessed from a plurality of image data files in a digital database in order to display such digitized image data on an image display device, said database containing image data files representing a plurality of sequentially adjacent input images, said method comprising the steps of:

providing a plurality of image memories for storing digitized image data read from the database;

in response to a read command signaling a desire to display a selected input image on the display device, reading a selected image data file representing such input image from the digital data base, storing the corresponding digitized image data in one of the image memories, and displaying the input image represented by the so stored digitized image data on the display device; and in response to the same read command, reading one or more additional image files representing input images that are sequentially adjacent to the input image represented by the selected image data file and storing the corresponding digitized image data in one or more of the remaining image memories without displaying the sequentially adjacent input images until a subsequent user command is registered, whereby access time to display a sequentially adjacent input image pursuant to a subsequent user command is shortened because the corresponding sequentially adjacent image file has already been read from the database and stored in one of the additional image memories.

* * * * *

(12) EX PARTE REEXAMINATION CERTIFICATE (9302nd)
United States Patent
Parulski et al.

(10) Number: US 5,414,811 C1
(45) Certificate Issued: Sep. 18, 2012

(54) METHOD AND APPARATUS FOR CONTROLLING RAPID DISPLAY OF MULTIPLE IMAGES FROM A DIGITAL IMAGE DATABASE

(76) Inventors: Kenneth A. Parulski, Rochester, NY (US); David L. Funston, Rochester, NY (US)

Reexamination Request:
No. 90/009,590, Oct. 2, 2009

Reexamination Certificate for:
Patent No.: 5,414,811
Issued: May 9, 1995
Appl. No.: 08/202,853
Filed: Feb. 25, 1994

Related U.S. Application Data (63) Continuation of application No. 07/796,207, filed on Nov. 22, 1991, now abandoned.

(51) Int. Cl.
*G06F 15/00* (2006.01)

(52) U.S. Cl. .................. 345/501; 345/536; 345/543; 345/557; 382/296; 382/304; 382/305
(58) Field of Classification Search ................... 395/162
See application file for complete search history.

(56) References Cited

To view the complete listing of prior art documents cited during the proceeding for Reexamination Control Number 90/009,590, please refer to the USPTO's public Patent Application Information Retrieval (PAIR) system under the Display References tab.

*Primary Examiner* — Dennis Bonshock (57) ABSTRACT

A digital image processing system for displaying digitized images on a screen of a display unit includes a data base such as a compact disc on which the digitized images are stored, a plurality of image memories for holding the digitized images for display, and a display unit having a screen including a two-dimensional array of pixels. The screen is divided into sections by designating subsets of the screen pixels by row and column, and the images stored in the image memories are allocated to the sections of the screen by mapping image data pixels to the screen pixels. Under user control, different images may be displayed on different sections of the screen. The number of images, and the specific images from the data base, are user selectable and independently manipulable. To reduce a latency time for displaying images responsive to user commands, the images may be arranged in a sequence. Responsive to a user command to load a first image into an image memory and display it, one or more other images adjacent to the first image in the sequence are read from the data base and held in other image memories, otherwise unused. Thus, if a subsequent user command directs the system to display one of the adjacent images, the latency time for reading that image from the data base and holding it in another image memory is reduced.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-9 and 15-17 is confirmed.

Claims 10-14 and 18-20 are cancelled.

* * * * *